United States Patent [19]
Williams et al.

[11] 3,972,962
[45] Aug. 3, 1976

[54] NON-MIGRATING POLYMERIC PLASTICIZERS FOR POLYVINYL CHLORIDE

[75] Inventors: Frederick R. Williams; Robert D. Aylesworth, both of Cincinnati, Ohio

[73] Assignee: Emery Industries, Inc., Cincinnati, Ohio

[22] Filed: Aug. 4, 1975

[21] Appl. No.: 601,479

Related U.S. Application Data

[62] Division of Ser. No. 408,696, Oct. 23, 1973, abandoned.

[52] U.S. Cl. .............................. 260/873; 260/31.6; 260/76
[51] Int. Cl.² ...................... C08L 67/02; C08K 5/11
[58] Field of Search .................. 260/31.6, 75 R, 76, 260/873, 476 R

[56] References Cited
UNITED STATES PATENTS

| | | | |
|---|---|---|---|
| 2,555,062 | 5/1951 | Small et al. ........................ | 260/31.6 |
| 2,815,354 | 12/1957 | Wilkinson et al. ................. | 260/404.8 |
| 3,149,087 | 9/1964 | Anagnostopoulos et al. ...... | 260/31.6 |
| 3,167,524 | 1/1965 | Lauck et al. ........................ | 260/31.6 |
| 3,370,032 | 2/1968 | Potter ................................. | 260/31.6 |
| 3,501,554 | 3/1970 | Aylesworth et al. ............... | 260/75 R |
| 3,595,824 | 7/1971 | Aylesworth et al. ............... | 260/31.6 |
| 3,850,871 | 11/1974 | Walus ................................. | 260/31.6 |

*Primary Examiner*—Murray Tillman
*Assistant Examiner*—W. C. Danison, Jr.
*Attorney, Agent, or Firm*—Gerald A. Baracka; John D. Rice

[57] ABSTRACT

Improved chain-stopped polyester plasticizers for polyvinyl chloride homopolymers and copolymers are provided. The plasticizers show little or no tendency to migrate from PVC, yet they are readily processable with the PVC. While being extremely compatible with PVC the present plasticizers have very low affinity for ABS and polystyrene resins and therefore can be used in applications where plasticized PVC comes in contact with these other resins.

3 Claims, No Drawings

NON-MIGRATING POLYMERIC PLASTICIZERS FOR POLYVINYL CHLORIDE

This is a division of application Ser. No. 406,696, filed Oct. 23, 1973, now abandoned.

BACKGROUND OF THE INVENTION

In order for a compound to function as a plasticizer for polyvinyl chloride (PVC) it must have sufficient affinity for the PVC to resist migration from the internal regions to the surface, however, some degree of mobility must be maintained within the polymer structure if flexibility is to be achieved. A proper balance between these two conflicting considerations must be maintained for effective and useful plasticization of PVC. The problem of the selection of a suitable plasticizer for PVC is further complicated when the plasticized PVC will come in contact with another dissimilar polymeric material. In these situations the plasticizer should not have affinity for the second polymer, otherwise the plasticizer will migrate to the surface of the PVC and into the other polymer substrate. In addition to reducing the amount of plasticizer in the PVC and thus detracting from the physical properties this uncontrolled migration can be even more detrimental to the other polymeric material. Migration of plasticizer to certain elastomeric polymers can for example, cause swelling of the elastomer. In the case of plasticizer migration to rigid materials stress cracking and embrittlement commonly occur.

Plasticizer migration is particularly troublesome in situations where plasticized PVC is contacted with polystyrene and acrylonitrile-butadienestyrene (ABS) resins. With ABS, marring of the ABS surface at the interface is common when conventional easy-processing type PVC plasticizers are used. The surface of the ABS becomes dull and is often accompanied by noticeable softening and swelling. In addition to affecting the appearance adversely, the polymer may be affected internally as evidenced by deterioration of the physical properties. Stress cracking (the formation of numerous tiny internal and surface cracks aligned in the same direction and usually arranged in more or less parallel plains) is the result of plasticizer migration and is attended by a loss in the physical strength of the polymer. Polystyrene resins are particularly prone to stress cracking (crazing) if they are placed in contact with PVC compositions plasticized with known easy-processing plasticizer types.

In view of the above-mentioned difficulties it would be highly desirable and advantageous to develop plasticizers for PVC which are readily processable and compatible with PVC but are essentially non-migrating. It would be even more desirable if these plasticizers had little or no affinity for ABS or polystyrene resins.

SUMMARY OF THE INVENTION

We have now discovered non-migrating polyester plasticizers which have 210°F viscosities of about 200–250 centistokes and which are readily processable with PVC homopolymers and copolymers. These polyesters have the further advantage that they have little or no affinity for ABS and polystyrene resins and therefore when plasticized PVC comes in contact with these resins, marring and crazing of the ABS and polystyrene is virtually eliminated. The present improved plasticizer compositions are chain-stopped polyesters having average molecular weights from about 1,500 to about 10,000 and more preferably from about 2,000 to 5,000. Molecular weights within these ranges are obtained by the use of an appropriate amount of the chain-stopping agent which is a monobasic aromatic acid containing about 7 to 20 carbon atoms. Benzoic acid and lower alkyl-substitute benzoic acids are especially useful aromatic acids for this purpose. Glycols employed are branched chain $C_4$–$C_{10}$ diols having either primary or secondary hydroxyl groups. Ester-diol (2-hydroxymethyl-2-methylpropyl-2-hydroxymethyl-2-methylpropionate) and neopentyl glycol are very useful branched chain glycols for the preparation of the present plasticizers. The useful dibasic acids are alpha-omega alkanedioic acids containing from 4 to 12, and more preferably from 6 to 10, carbon atoms. The present polyesters are obtained using conventional esterification procedures.

DETAILED DESCRIPTION

The plasticizer compositions of the present invention are useful for PVC homopolymers and PVC copolymers wherein one or more other ethylenically unsaturated monomers is copolymerized with vinyl chloride. Comonomers useful in the preparation of the polyvinyl chloride copolymers include: vinyl bromide; vinyl acetate; vinylidene chloride; lower allyl esters; vinyl alkyl ethers, acrylonitrile and methacrylonitrile; acrylic acid and methacrylic acid; acrylic and methacrylic esters such as methyl acrylate, ethyl acrylate and methyl methacrylate; styrene; and the like. Copolymers obtained by the copolymerization of vinyl chloride with vinyl acetate, vinyl chloride with vinyl butyrate, vinyl chloride with vinyl propionate, vinyl chloride with methyl methacrylate, vinyl chloride with vinylidene chloride and vinyl chloride with two or more comonomers such as mixtures of vinylidene chloride and 2-ethylhexylacrylate find particular utility with the present polymeric polymerized vinyl chloride and more preferably 75 wt. % or more bound vinyl chloride.

The improved polymeric plasticizers of this invention are chain-stopped polyesters having average molecular weights ranging from about 1,500 to about 10,000. Preferably the polyesters will range between about 2,000 and 5,000 molecular weight. These polyesters are obtained by the condensation reaction of a dibasic acid, a glycol and a quantity of monobasic acid sufficient to terminate the chain ends and obtain molecular weights in the above defined ranges.

Dibasic acids useful in the formation of the polymeric plasticizers are alpha-omega alkanedioic acid acids containing from about 4 to 12 carbon atoms and more preferably from 6 to 10 carbon atoms. Representative aliphatic dicarboxylic acids of the above types include glutaric acid, succinic acid, adipic acid, pimelic acid, suberic acid, azelaic acid, sebacic acid and dodecanedioic acid. In addition to the acids the corresponding acid anhydrides may be successfully utilized. Small amounts of acid impurities, such as aromatic dicarboxylic acids, may be present without significantly affecting the overall properties of the plasticizers. Adipic acid, azelaic acid and sebacic acid are especially useful for the present invention because of their commercial availability and the superior characteristics i.e., ready compatability with the PVC without destroying the processing characteristics of the PVC and little or no tendency to migrate, of plasticizers obtained when these acids are reacted with branched chain diols and monobasic aromatic acids which will subsequently be more fully described.

The glycols used are branched-chain dihydric alcohols containing from about 4 to 10 carbon atoms. The hydroxyl groups may be either primary or secondary, however, glycols containing tertiary groups are not recommended. For the purpose of this invention a glycol containing a secondary hydroxyl group is considered to be a branched-chain alcohol. Useful glycols of the above type include: 2-hydroxymethyl-2-methylpropyl-2-hydroxymethyl-2-methylpropionate (hereinafter referred to as ester-diol), neopentyl glycol, 2-methyl-1,3-propane diol, 3-methyl-1,5-pentane diol, 2,2,4-trimethyl-1,3-pentane diol, 2,3-dimethyl-2,3-butane diol, 1,2-propylene glycol, 1,3-butylene glycol, 1,2-butanediol, 1,2-pentanediol, 1,3-pentanediol, 1,4-pentanediol, and the like. Exceptional results are obtained when neopentyl glycol or ester-diol are used as the branched-chain diol, either by themselves or in combination with other diols.

While branched chain glycols are essential if plasticizers having the desired low migration and compatibility with PVC are to be obtained, it is not necessary that the total glycol charge consist of branched-chain diols. Up to about 30 wt. % of the total glycol charge can consist of linear diols, however, it is preferred when linear glycols are present that they comprise less than about 20% of the total glycol charge. Other glycols which can be included in the diol charge are linear aliphatic primary glycols containing from about 2 to 12 carbon atoms, such as ethylene glycol, 1,3-propylene glycol, 1,4-butylene glycol and the like.

To achieve plasticizers having the desired balance of migration properties and compatibility with PVC and which have molecular weights in the above defined ranges it is essential that an aromatic monobasic acid be employed as a chain terminator. These aromatic monocarboxylic acids will contain from about 7 to about 20 carbon atoms. They may additionally contain one or more other substituents on the aromatic nucleus such as alkyl, nitro, halo, alkoxyl and acyl groups. Typical monobasic aromatic acids of the above types include benzoic acid, the toluic acids, the nitrobenzoic acids, the methoxybenzoic acids, the chlorobenzoic acids and the like. Because of their ready availability and the superior results obtained therewith, the benzoic acid and $C_{1-4}$ alkyl substituted benzoic acids are preferred for use as the chain terminator.

Although each of the components of the polymeric plasticizers of this invention is known in the prior art, the present plasticizer compositions are novel and possess unique properties. This is a result of the particular combination of reactants and the proportions at which they are employed. Absence of branched chain glycols or failure to chain terminate with a monobasic aromatic acid will not yield plasticizers having the desired properties, that is, which are readily compatible with PVC yet have little or no tendency to migrate from the PVC to ABS or polystyrene, thus eliminating crazing and marring of the ABS and polystyrene polymers.

The plasticizers of this having may be used with the above-described vinyl resins both as primary plasticizers and in combination with secondary plasticizers. It is preferred that these polyesters be the sole plasticizer in applications where the polymer will come in contact with ABS and polystyrene resins if crazing and marring is to eliminated. Where these are not important considerations, however, PVC resin formulations can be prepared having a wide range of properties by varying the proportion and types of plasticizers used in conjunction with the instant polyesters. The proportion of the polyester plasticizer in the resin may be varied widely and can range from about 10 to about 150 parts, and preferably from about 30 to about 110 parts, by weight, per 100 parts by weight of the vinyl chloride homopolymer or copolymer. When the present plasticizers are combined with others the total amount of plasticizer should generally fall in the prescribed ranges. In accordance with the present invention other compounding ingredients can also be employed in conjunction with the plasticizer/polymer mixture. for example, stabilizers to protect the resin against the deleterious affects of oxidative, thermal and photochemical degradation, fillers, pigments, dyes, lubricants and other processing aids can be incorporated in the plasticized PVC composition. As is evident to those skilled in the art of compounding and formulating PVC judicious selection of the compounding ingredients may be required to maintain the desired physical characteristics of the PVC.

The reaction of the dicarboxylic acid, branched-chain glycol and monobasic aromatic acid terminator to obtain the desired polyester plasticizer compositions is carried out in conventional equipment using established esterification procedures. The reactants are added to a suitable esterification kettle as a unit charge. The reaction is then typically heated at a temperature from about 150° C to about 250° C at atmospheric pressure for a period of time sufficient to substantially complete the esterification, usually about 3 to 8 hours. The reaction is generally conducted to an acid value less than about 10 and acid values of 5 or below are even more preferred. The rate of esterification can be enhanced by the use of suitable esterification catalysts such as phosphoric acid, sulfuric acid, p-toluene sulfonic acid, methane sulfonic acid, stannous oxalate, alkyl tin oxides, tetrabutyl titanate, zinc acetate, sodium carbonate and the like. The amount and type of catalyst can be widely varied, however, most often the amount of catalyst will range from about 0.1 to about 1.0% by weight of the total reactant charge. At the completion of reaction the catalyst may be deactivated or removed by filtering or other conventional means. While the reaction may be conducted entirely at atmospheric pressure it is generally more desirable to apply a vacuum (typically 2–50 mm Hg at 200°–250° C) to the system during the latter stages of the reaction. This is particularly advantageous if low acid values are to be obtained. It also facilitates removal of any excess glycol and small amounts of other volatile materials which may be present.

Inert diluents such as benzene, toluene, xylene and the like can be employed in carrying out the reaction, however, they are not necessary. In fact, it is generally considered desirable to conduct the reaction without diluents since the polymeric plasticizer is then suitable for use as it is obtained from the esterification reactor.

While the practice of charging the reactants to form the polyesters will vary it is preferred that the monobasic aromatic acid, the dibasic acid and branched-chain glycol or mixture of glycols be charged to the reactor with a small excess (based on the stoichiometric or equivalent amount calculated for the acid present) of the glycol component. The excess glycol serves as the reaction medium and is distilled off as the esterification reaction is carried to completion. The removed glycol may be recycled to the esterification reactor if desired.

Usually 24% by weight excess glycol (above theory) will suffice for this purpose, however, more can be utilized if desired. To obtain polyesters in the desired molecular weight range about 3 to 15 mol percent of the organic acid charge will be monobasic aromatic acid. More usually, the monobasic aromatic acid constitutes about 6 to 12 mole percent of the total organic acids.

The following examples serve to illustrate the invention more fully, however, they are not intended as a limitation on the scope thereof. In the examples all weights and percentages are on a weight basis unless otherwise indicated.

EXAMPLE I

PREPARATION OF A TYPICAL PLASTICIZER

The esterification was carried out in a 3-necked round bottom flask equipped with a suitable stirrer, a thermometer and a medium length Vigreaux distillation column and a condenser. The condenser was arranged so that material could be distilled from the reaction at either atmospheric or reduced pressure. The reactant charge was as follows:

| | |
|---|---|
| Azelaic Acid | 0.970 equivalent |
| Ester Diol | 0.271 equivalent* |
| 1,2-propylene Glycol | 0.729 equivalent* |
| Benzoic Acid | 0.030 equivalent |

*A small excess of the glycols was employed.

The mixture was esterified by slowly heating the contents of the flask to 225°–235° C. while removing the water of reaction. The temperature was maintained at this level until the rate of reaction slowed materially as evidenced by a markedly reduced rate of water evolution. At this point a small amount, about one gram, of tetrabutyl titanate was added to the reactor and the reaction continued while pulling a vacuum on the system. The pressure was gradually reduced with the temperature at 225°–250° C. at such a rate that a controlled distillation (removal of water and excess glycol) took place to a final pressure of about 3 mm. at 225° C. The progress of the reaction was followed by determining the acid value (AV) of the reaction mixture and the reaction was terminated when the AV reached about 0.5. The reaction mixture was then cooled to room temperature, filtered using diatomaceous earth filter aid to remove catalyst residue and other impurities and then stored for subsequent evaluation as a plasticizer. The final polyester product had an AV of 0.47, a hydroxyl value of 19.1 and a 210° F. viscosity of 236 centistokes. The average molecular weight of the resulting polyester determined by vapor pressure osmometry was 4100. The clear light-colored polyester was used as a plasticizer, without further modification or processing. It was readily incorporated into PVC resin using conventional processing equipment to produce a clear, pliable sheet.

EXAMPLES II–VI

A variety of other polyester plasticizer compositions were prepared in accordance with the procedure described in Example I. In these Examples an excess of glycol based on the total equivalents of acid present, was employed. The compositions of these materials in equivalents are set forth in Table I as well as the acid value, hydroxyl value and 210° F. viscosity.

EXAMPLE VII

Formulation of PVC Resin

The polyesters prepared in the preceding examples were evaluated as plasticizers for PVC in accordance with the following recipe:

| | |
|---|---|
| PVC Resin (Geon 93) | 100 parts |
| Calcium carbonate | 40 parts |
| Stabilizer (triphenyl phosphite) | 1 part |
| Stabilizer (mixed Ba-Cd soaps) | 2 parts |
| Epoxidized soya (6.8-7 oxirane content) | 4 parts |
| Polyester plasticizer | 86 parts |

The PVC and other compounding ingredients were blended for about ten minutes on a standard two-roll rubber mill in which the 6 × 12 inch rolls were heated to about 170° C. The sheets as obtained from the mill were then pressed in sheets of uniform thickness using a chrome-plated ASTM mold at about 177° C for six minutes at a pressure of 1,500 psi. Suitable specimens were then cut from the pressed sheets for each of the various tests to be conducted. Performance properties of resins obtained in this manner and plasticized with the present polyester plasticizer are set forth below.

TABLE I

| EXAMPLE NO. | ADIPIC ACID | AZELAIC ACID | ESTER DIOL | 1,3-BUTYLENE GLYCOL | 1,2-PROPYLENE GLYCOL | BENZOIC ACID | ACID VALUE | HYDROXY VALUE | VISCOSITY 210° F(cs) |
|---|---|---|---|---|---|---|---|---|---|
| II | 0.90 | — | — | 1.35 | — | 0.10 | 1.4 | 17.3 | 235 |
| III | — | 0.90 | — | — | 1.35 | 0.10 | 1.9 | 10.1 | 205 |
| IV | 0.960 | — | 0.271 | — | 0.729 | 0.040 | 0.8 | 12.6 | 231 |
| V | 0.960 | — | 0.271 | 0.729 | — | 0.040 | 4.0 | 11.7 | 208 |
| VI | 0.462 | 0.538 | 0.271 | — | 0.764 | 0.035 | 0.8 | 9.4 | 246 |

| | PVC WITH PLASTICIZER OF EXAMPLE | | | |
|---|---|---|---|---|
| | I | IV | V | VI |
| Elongation (%) | 400 | 350 | 345 | 370 |
| 100% Modulus (psi) | 700 | 850 | 750 | 740 |
| Tensile Strength (psi) | 1900 | 2050 | 1825 | 1950 |
| Shore "A" Hardness | 68 | 80 | 72 | 75 |
| Bittle Point (0°C) | −12.5 | −7.5 | −9.5 | −12.5 |
| Extraction (% wt. loss): | | | | |
| Hexane (25°C;24 hrs) | 2.9 | — | 0.4 | 1.0 |
| Oil (50° C; 24 hrs) | 0.8 | 0.6 | 0.7 | 0.6 |
| Soapy Water (90° C;24 hrs) | 4.2 | 5.9 | 5.8 | 4.6 |

The above data shows that excellent physical properties are obtained for PVC plasticized with the present polyester compositions and that these polyesters have little or no tendency to migrate and are highly resistant to extraction.

EXAMPLE VIII

The plasticizer of Example I formulated in accordance with Example VII was evaluated for ability to resist migration and marring of ABS resins and compare with comparable PVC formulations plasticized with well-known commercially available plasticizers. In this test, referred to as the sandwich test, a 1 × 1 inch specimen is cut from 75 mil compounded PVC sheet and placed on the smooth side of the ABS test panel. The panel and test specimen are then sandwiched between two pieces of glass and a pressure of 2 psi maintained. The assembly is then placed in a 70° C. oven for 10 days. At the completion of the test period the PVC is removed from the ABS panel and the ABS surface visually examined to determine the extent of marring on the surface of the ABS. Using three different commercially available ABS resins and PVC plasticized with the polyester of Example I, no marring was observed for one of the ABS samples and only slight marring was present with the other two ABS samples. These same ABS resins tested with PVC formulated in the same manner but using commercial plasticizers (Paraplex G-57 and Santicizer 429) showed significantly increased marring. With both commercial plasticizers severe marring was obtained with two of the ABS resins and moderate marring was observed with the other ABS samples.

EXAMPLE IX

To further demonstrate the resistance of the present polyester composition to migration, thus minimizing or eliminating crazing when PVC plasticized therewith is contacted with polystyrene sheets the following test was conducted. Samples (¾ inch × 5¼ inches) were cut parallel to the extrusion direction from 0.090–0.100 inch Monsanto HT-92 extruded polystyrene sheet. Flexural strength of this material was at least 7,000 psi. Each sample was measured with a micrometer at its center for width and thickness dimensions. The sample was then wrapped with the rear side in tension over a brass jig of radius 7.000 ± 0.002 inch and taped to the jig at the ends. This assembly was then placed against the tail of the PVC test gasket and forced against it by applying 20 inch-pounds torque to a ¼ inch-16 bolt against the top of the jig. The assembly was immediately placed in a chamber at 50° C. and stored for 4 hours. After immediate disassembly the styrene part was allowed to stand at room temperature for at least 15 minutes and then tested for flexural strength (ASTM D-790), using a 1 inch span and crosshead motion of 0.05 inch per minute. Strength was calculated from the equation:

$$\text{Strength (psi)} = \frac{3 \times \text{load}}{2 (\text{thickness})^2 (\text{width})}$$

Results are the average of at least 5 samples. Percent retention of strength compared to unexposed polystyrene is then reported. Ninety percent or greater retention is considered excellent. Results obtained were as follows:

| PLASTICIZER OF EXAMPLE | STRENGTH RETENTION (%) |
|---|---|
| I | 90.4 |
| IV | 92.9 |
| V | 96.1 |
| VI | 91.4 |

EXAMPLE X

Additional testing was conducted with the PVC compositions plasticized with the polyesters prepared above to demonstrate the superior migration characteristics, i.e. little or no tendency to migrate, of these polyesters. In this instance a bending form test was employed with polystyrene resin.

Stress free molded polystyrene sheet (0.125 ± 0.005 inch) was conditioned and tested (in duplicate) in a room maintained at 72° F. ±1° F. and 50 ±2 percent R.H. Strips of polystyrene (½ inch × 8 inches) were cut with a circular table saw using a veneer type blade taking care to prevent finger marking by handling only with gloves. The edges of each test bar were then scraped with a knife to remove burrs left from cutting. Each polystyrene test strip was wrapped in white mimeograph paper and sandwiched between glass plates and placed in a forced air oven (150° F.) for 24 hours. The assembled glass and strips were removed and allowed to cool to room temperature for at least 4 hours.

Seven inch × 3/16 inch strips were cut from the compounded 20 mil PVC sheet and wiped with methanol to remove any contamination. The smooth side of the vinyl strip was then placed directly against the polystyrene test strip and light pressure applied to the vinyl to insure good contact while centering as close as possible on the test strip. The assembly was then placed on the eliptical bending bar between the 18 and 12 marks and clamped so that the test strip conformed to the contour of the bending bar. The bending form was placed horizontally on a table with the test specimen upward and allowed to stand undisturbed for 4 days after which time the PVC test strip was removed. The point at which the pattern of crazing has stopped is then determined by visual examination and reported as inches of craze. The lower this value is the better the performance of the plasticizer. Results obtained employing the plasticizers of Examples I, IV, V and VI were 0.7, 0.3, 0.0 and 1.0 inches, respectively.

We claim:
1. An improved polymer composition comprising polyvinyl chloride homopolymer or polyvinyl chloride copolymer and 10 to 150 parts by weight per 100 parts vinyl resin of a chain-terminated polyester having an average molecular weight between about 2,000 and 5,000 and 210°F viscosity between 200 and 250 centistokes, said polyester composition obtained by the esterification of (a) an aliphatic saturated dicarboxylic acid containing 6 to 10 carbon atoms, (b) 2-hydroxymethyl-2-methylpropyl-2-hydroxymethyl-2-methylpropionate having the structural formula

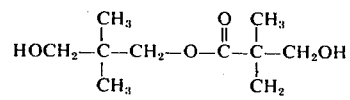

and (c) about 2 to 15 mole percent, based on the total acids of an aromatic monocarboxylic acid containing from 7 to 20 carbon atoms.

2. The polymer composition of claim 1 containing 30 to 110 parts polyester per 100 parts resin.

3. The improved polymer composition of claim 1 wherein the aliphatic saturated dicarboxylic acid is adipic acid, azelaic acid or sebacic acid and the aromatic monocarboxylic acid is benzoic acid or a $C_{1-4}$ alkyl substituted benzoic acid.

* * * * *